United States Patent
Deshmukh

(10) Patent No.: US 12,493,712 B2
(45) Date of Patent: Dec. 9, 2025

(54) DATA OWNER CONTROLS IN DLP

(71) Applicant: Zscaler, Inc., San Jose, CA (US)

(72) Inventor: Pooja Deshmukh, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 655 days.

(21) Appl. No.: 17/566,039

(22) Filed: Dec. 30, 2021

(65) Prior Publication Data

US 2022/0198055 A1 Jun. 23, 2022

Related U.S. Application Data

(63) Continuation-in-part of application No. 17/132,499, filed on Dec. 23, 2020, now Pat. No. 11,863,674.

(51) Int. Cl.
| | |
|---|---|
| G06F 7/04 | (2006.01) |
| G06F 16/22 | (2019.01) |
| G06F 21/62 | (2013.01) |
| H04L 9/40 | (2022.01) |

(52) U.S. Cl.
CPC ...... G06F 21/6245 (2013.01); G06F 16/2272 (2019.01); H04L 63/1425 (2013.01)

(58) Field of Classification Search
CPC . H04L 9/3213; H04L 9/3247; H04L 63/0428; H04L 63/1416; H04L 63/30; H04L 63/1408; H04L 63/04; H04L 9/3226; H04L 9/0643; G06F 40/284; G06F 21/552; G06F 21/6263; G06F 21/64; G06F 21/6218; H04W 12/80; H04W 12/02

See application file for complete search history.

(56) References Cited

U.S. PATENT DOCUMENTS

| | | | | |
|---|---|---|---|---|
| 7,996,373 | B1* | 8/2011 | Zoppas | G06F 21/556 |
| | | | | 707/694 |
| 9,401,926 | B1* | 7/2016 | Dubow | H04L 63/1433 |
| 9,654,510 | B1* | 5/2017 | Pillai | H04L 63/20 |
| 10,412,102 | B1* | 9/2019 | Fridman | G06F 16/901 |
| 2017/0346804 | A1* | 11/2017 | Beecham | H04L 9/3236 |

(Continued)

OTHER PUBLICATIONS

Schiff et al, PRI: Privacy Preserving Inspection of Encrypted Network Traffic, May 26, 2016, IEEE, pp. 296-303. (Year: 2016).*

(Continued)

*Primary Examiner* — Philip J Chea
*Assistant Examiner* — Jenise E Jackson
(74) *Attorney, Agent, or Firm* — Baratta Law PLLC; Lawrence A. Baratta, Jr.

(57) ABSTRACT

Systems and methods include receiving an index of data for exact data matching, wherein the index includes Personally Identifiable Information (PII); receiving policy related to actions to perform for any violations associated with the exact data matching; loading the index and the policy into memory; monitoring traffic for violations, wherein the violations include detection of any values in the index in the traffic; and performing an action responsive to any violations and associated policy. The action can be one of reporting the violation, blocking the traffic associated with the violation, reporting the violation and allowing the traffic associated with the violation when the violation is based on authenticated PII, allowing the traffic associated with the violation when the violation is based on authenticated PII, and a combination thereof.

18 Claims, 12 Drawing Sheets

(56) References Cited

U.S. PATENT DOCUMENTS

| | | |
|---|---|---|
| 2018/0181769 A1* | 6/2018 | Vora ............... H04L 63/105 |
| 2018/0189517 A1* | 7/2018 | Larson ............... G06F 21/60 |
| 2020/0260287 A1* | 8/2020 | Hendel ............... G06N 5/04 |
| 2020/0311304 A1* | 10/2020 | Parthasarathy ..... G06F 11/3006 |
| 2021/0326460 A1 | 10/2021 | Zhang et al. |
| 2021/0336934 A1 | 10/2021 | Deshmukh et al. |
| 2023/0224377 A1* | 7/2023 | Bathla ............... H04L 63/1416 |
| | | 726/22 |

OTHER PUBLICATIONS

Corin et al. Dynamic and Application-Aware Provisioning of Chained Virtual Security Network Functions, Sep. 12, 2019, IEEE, pp. 294-307. (Year: 2019).*

* cited by examiner

EMPLOYEE RECORDS

| RECORD # | FIRST NAME | LAST NAME | CREDIT CARD NUMBER | SSN NUMBER | STREET ADDRESS | CITY | ZIP CODE |
|---|---|---|---|---|---|---|---|
| 1 | Quan | Chi | 1111111111111111 | 111-22-3333 | 3400 Main | Burbank | 91505 |
| 2 | Shang | Tsung | 2222222222222222 | 222-33-4444 | 3400 Main | Burbank | 91505 |
| 3 | Johnny | Cage | 3333333333333333 | 333-44-5555 | 3400 Main | Burbank | 91505 |
| 4 | Sonya | Blade | 4444444444444444 | 444-55-6666 | 3400 Main | Burbank | 91505 |
| 5 | Kung | Lao | 5555555555555555 | 555-66-7777 | 3400 Main | Burbank | 91505 |
| 6 | Cassie | Cage | 6666666666666666 | 666-77-8888 | 3400 Main | Burbank | 91505 |

OUTBOUND EMAIL

Hey John,

Do you think Johnny Cage debuted as one of the series' original seven characters? Pull his record with ID 333-44-5555. Send me the details on his winning stats. Let's see if he can be a good choice as an opponent for tomorrow's match.

------

Regards,
Ed

FIG. 4

"The social security number 123456789 belongs to John Doe"

Tokens: the, social, security, number, 123456789, belongs, john, doe

Window size: 8

DATA OWNER CONTROLS IN DLP

CROSS-REFERENCE TO RELATED APPLICATION(S)

The present disclosure is a continuation-in-part of U.S. patent application Ser. No. 17/132,499, entitled "DLP appliance and method for protecting data sources used in data matching, filed Dec. 23, 2020, the contents of which are incorporated by reference herein in their entirety.

FIELD OF THE DISCLOSURE

The present disclosure generally relates to computer and network security systems and methods. More particularly, the present disclosure relates to systems and methods for data owner control in Data Loss/Leakage Prevention (DLP).

BACKGROUND OF THE DISCLOSURE

With the proliferation of devices (e.g., Bring Your Own Device (BYOD)), cloud services, and the like, there is a need for enterprises to monitor content for so-called Data Loss/Leakage Prevention (DLP). Specifically, data loss or data leakage is where sensitive information is removed from the confines of an enterprise's control, such as via email, file sharing, file transfers, etc. Security breaches have become commonplace, and there is a need to prevent such data loss. Of note, data loss can also be inadvertent through careless or misinformed employees or the like.

Data is classified as structured or unstructured. Structured data resides in fixed fields within a file such as a spreadsheet or in relational databases, while unstructured data refers to free-form text or media as in text documents, PDF files, and video. An estimated 80% of all data is unstructured and 20% structured according to Burke, "Information Protection and Control survey: Data Loss Prevention and Encryption trends," IDC, May 2008. Data classification is divided into content analysis, focused on structured data and contextual analysis which looks at the place of origin or the application or system that generated the data. Methods for describing sensitive content exist. They can be divided into precise and imprecise methods. Precise methods involve content registration and trigger almost zero false positive incidents. All other methods are imprecise and can include: keywords, lexicons, regular expressions, extended regular expressions, meta data tags, Bayesian analysis and statistical analysis techniques such as Machine Learning, etc.

With the continued focus on the value of data, the move to the cloud, etc., there is a need for an efficient and precise approach to detect sensitive data. The problem statement can be summarized as: given a stream of bytes and structured signature data generated from multiple relational data sources, an approach must identify related tokens that exist in one record of a data source. Of note, existing DLP solutions can detect categories of data, e.g., XXX-XXX-XXXX where X is a number can be flagged as a social security number, and similarly for other categories of data (e.g., credit card numbers, etc.). However, there is a need to detect exact matches of data, e.g., exact social security numbers, credit card numbers, etc.

Exact Data Matching (EDM) advantageously can be very efficient and good at detecting and blocking data leakage. The systems and methods can read a large amount of customer-specific sensitive data (e.g., Personally Identifiable Information (PII), names, account numbers, etc.) securely and block transactions, to avoid data leakage. While effective, this can be problematic for legitimate transactions. For example, employee Sonya Blade is making a payment online during office break hour. The exact data match catches that as a possible data loss and prevents Sonya from using her own credit card for valid reasons. Employee Quan Chi is sending his own w2 forms containing his SSN to tax consultant. Quan Chi is prevented from doing so due to high precision EDM catching as a possible data loss incident. On trying to perform this action multiple times, Quan Chi is flagged as a repeat offender in Cloud Access Security Broker (CASB), reports. In both scenarios, the actual data owner lost control over their own PII. In both scenarios, the DLP Administrator had to triage a false positive incident where data owner is only working on their own personal data

BRIEF SUMMARY OF THE DISCLOSURE

Exact Data Matching (EDM) is the ability to identify a record from a structured data source that matches a pre-defined criterion. Enterprises (health care providers, banks etc) want to protect PII information from being lost. It is crucial to identify and correlate multiple tokens, which contribute to single data record. The present disclosure relates to systems and methods for data owner control in Data Loss/Leakage Prevention (DLP). Specifically, the present disclosure provides user flexibility to grant data owners the ability to share their own PII data without blocking in DLP. This approach is highly configurable allowing controls at individual field level, to allow data owners to use their own personal data through a DLP system, and reducing false positive incidents of flagging data owner as an offender of causing potential data loss incident.

In various embodiments, the present disclosure includes a method having steps, a node in a cloud-based system configured to implement the steps, and a non-transitory computer-readable medium storing instructions that cause one or more processors to perform the steps. The steps include receiving an index of data for exact data matching, wherein the index includes Personally Identifiable Information (PII); receiving policy related to actions to perform for any violations associated with the exact data matching; loading the index and the policy into memory; monitoring traffic for violations, wherein the violations include detection of any values in the index in the traffic; and performing an action responsive to any violations and associated policy.

The action can be one of reporting the violation, blocking the traffic associated with the violation, and a combination thereof. The action can also be one of reporting the violation, blocking the traffic associated with the violation, reporting the violation and allowing the traffic associated with the violation when the violation is based on authenticated PII, allowing the traffic associated with the violation when the violation is based on authenticated PII, and a combination thereof.

The steps can further include detecting a violation is authenticated PII of user performing transmission of the traffic, and allowing the authenticated PII. The steps can further include detecting a violation is authenticated PII where the traffic is associated with a data owner of the authenticated PII, and allowing the authenticated PII; and detecting a second violation is unauthenticated PII, and blocking the second violation.

The index can further include a user identifier, and the policy further includes allowability of some or all of the PII that is authenticated PII, wherein the authenticated PII includes PII for a given user based on the user identifier. The index can be based on a one-way hash to transform the data into a digest, such that the data is unreadable by a cloud-based system.

In another embodiment, a method of Exact Data Matching (EDM) for identifying related tokens in data content using structured signature data implemented in a cloud-based system includes receiving data sets and customer configuration from a customer, wherein the data sets comprise customer specific sensitive data from a structured data source with each token represented by a hash value and the customer configuration includes one or more primary keys for a plurality of records in the data sets; distributing the data sets and the customer configuration to a plurality of nodes in the cloud-based system; performing monitoring of content between a client of the customer and an external network; detecting a presence of a plurality of tokens associated with a record in the customer specific sensitive data based on the monitoring; and performing a policy-based action in the cloud-based system based on the detecting. The customer specific sensitive data can be received with the tokens represented by the hash value such that the tokens are formed by a one-way hash preventing recreation of the customer specific sensitive data therefrom. The data sets and the customer configuration can be provided from an Advanced Data Protection (ADP) appliance operated by the customer and under the customer's control. The cloud-based system can be a multi-tenant system supporting a plurality of customers comprising the customer, and wherein the distributing can include distributing the data sets and the customer configuration for each of the plurality of customers together.

The tokens can include one of a plurality of tokens types and a tokenizer operated during the detecting can be configured to characterize each token in the data content based on a delimiter and associated rules. The plurality of tokens types can include a word token, a number token, an alphanumeric token, and an email token. The tokenizer can perform a plurality of optimizations while scanning the data content to optimized scanning of subsequent tokens. The tokenizer can be configured look back at characters when determining the alphanumeric token. The detecting can utilize a token window of size N and a target hit window which stores tokens detected as the one or more primary keys, wherein the detecting can include looking back through the token window upon detection of the one or more primary keys to check for associated tokens from a record of the one or more primary keys.

In another embodiment, a cloud node in a cloud-based system configured to perform Exact Data Matching (EDM) for identifying related tokens in data content using structured signature data includes a network interface; a processor communicatively coupled to the network interface; and memory storing instructions that, when executed, cause the processor to: receive data sets and customer configuration from a customer, wherein the data sets comprise customer specific sensitive data from a structured data source with each token represented by a hash value and the customer configuration comprises one or more primary keys for a plurality of records in the data sets; distribute the data sets and the customer configuration to a plurality of nodes in the cloud-based system; perform monitoring of content between a client of the customer and an external network; detect a presence of a plurality of tokens associated with a record in the customer specific sensitive data based on the monitoring; and perform a policy-based action in the cloud-based system based on detection of the plurality of tokens. The customer specific sensitive data can be received with the tokens represented by the hash value such that the tokens are formed by a one-way hash preventing recreation of the customer specific sensitive data therefrom. The data sets and the customer configuration can be provided from an Advanced Data Protection (ADP) appliance operated by the customer and under the customer's control. The cloud-based system can be a multi-tenant system supporting a plurality of customers comprising the customer, and wherein the data sets can be distributed by distribution of the data sets and the customer configuration for each of the plurality of customers together.

The tokens can include one of a plurality of tokens types and a tokenizer operated while the presence is detected is configured to characterize each token in the data content based on a delimiter and associated rules. The plurality of tokens types can include a word token, a number token, an alphanumeric token, and an email token. The tokenizer can perform a plurality of optimizations while scanning the data content to optimized scanning of subsequent tokens. The tokenizer can be configured look back at characters when determining the alphanumeric token. The detection of the presence can utilize a token window of size N and a target hit window which stores tokens detected as the one or more primary keys, wherein the detection of the presence can include looking back through the token window upon detection of the one or more primary keys to check for associated tokens from a record of the one or more primary keys.

In a further embodiment, an Advanced Data Protection (ADP) appliance operated by a customer of a cloud-based system and configured to provide data sets for Exact Data Matching (EDM) for identifying related tokens in data content using structured signature includes a network interface; a processor communicatively coupled to the network interface; and memory storing instructions that, when executed, cause the processor to: define a customer configuration comprising one or more primary keys for a plurality of records in data sets; process the data sets comprising customer specific sensitive data from a structured data source to provide a hash value for each token; provide the customer configuration and the processed data sets to the cloud-based system for EDM monitoring therein of clients associated with the customer; and, responsive to detection of a presence of a plurality of tokens associated with a record in the customer specific sensitive data and a policy-based action based thereon in the cloud-based system, receive a notification of the detection. The customer specific sensitive data can be provided with the tokens represented by the hash value such that the tokens are formed by a one-way hash preventing recreation of the customer specific sensitive data therefrom.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a mobile device, which may be used in the cloud-based system of FIG. 1 or the like.

FIG. 4 is a diagram of an example of Exact Data Matching (EDM) with a structured data source and an associated example email message.

DETAILED DESCRIPTION OF THE DISCLOSURE

Figure 1A:
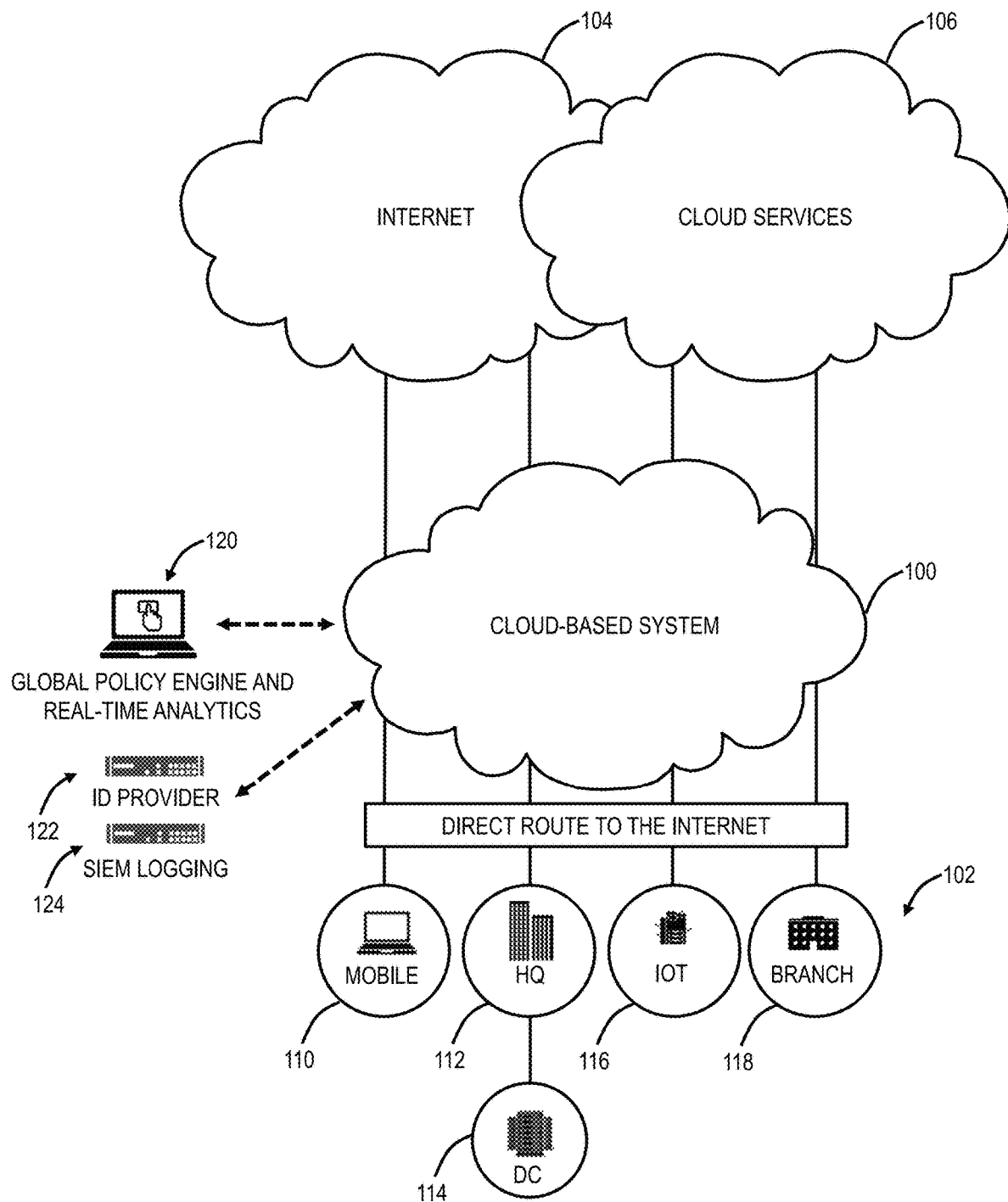
FIG. 1A is a network diagram of a cloud-based system offering security as a service.

Again, the present disclosure relates to systems and methods for data owner control in Data Loss/Leakage Prevention (DLP). Specifically, the present disclosure provides user flexibility to grant data owners the ability to share their own PII data without blocking in DLP. The present disclosure includes the ability for data owners (PII data) the flexibility to share only their own data. Organizations want to relax blocking employee's personal data from being shared with their personal email/file share accounts. Identifying and correlating multiple tokens that contribute to a particular record to identify ownership of the data is crucial.

Also, in various embodiments, the present disclosure relates to systems and methods for identification of related tokens in a byte stream using structured signature data, such as for DLP, content classification, etc. The systems and methods provide an Exact Data Matching (EDM) approach with the ability to identify a record from a structured data source that matches predefined criterion. The systems and methods utilize structured data to define content for detection and, in a stream of bytes, the systems and methods identify related tokens that constitute one record of a relational data source and are within a certain distance from each other in the data stream. The systems and methods generate structured signature data from relational data sources and generate a lookup table (LUT) using one or more columns of every data source as indexes. By reference to EDM, the systems and methods enable operators to detect specific data content as opposed to generalized categories.

Using an index table and hashed signature data, the systems and methods identify the set of tokens in a byte stream that correlate to one record of a data source. The systems and methods can also identify partial matches, i.e., the set of tokens in the byte stream that constitute some or any columns of a relational data source. The systems and methods use structured signature data generated from the relational data sources. Only the signature data is used thereafter, and the original data cannot be recreated from the signature data, so the signature data can be safely ported to an unsecured location.

The systems and methods contemplate cloud-based operation in an embodiment. The systems and methods can read a large amount of customer-specific sensitive data (e.g., Personally Identifiable Information (PII), names, account numbers, etc.) securely. The systems and methods generate and store signatures of this data which are in an efficient format for distribution (e.g., in the cloud), enable fast matching, and provide security as the content is not obtainable from the signature. With this approach, the systems and methods can distribute the optimized signatures across various enforcement nodes in a cloud based system for detecting signatures in data streams processed at the enforcement node. Upon detection, the systems and methods can prescribe a policy based action such as allow, block, notify, quarantine, etc.

Example Cloud-Based System

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
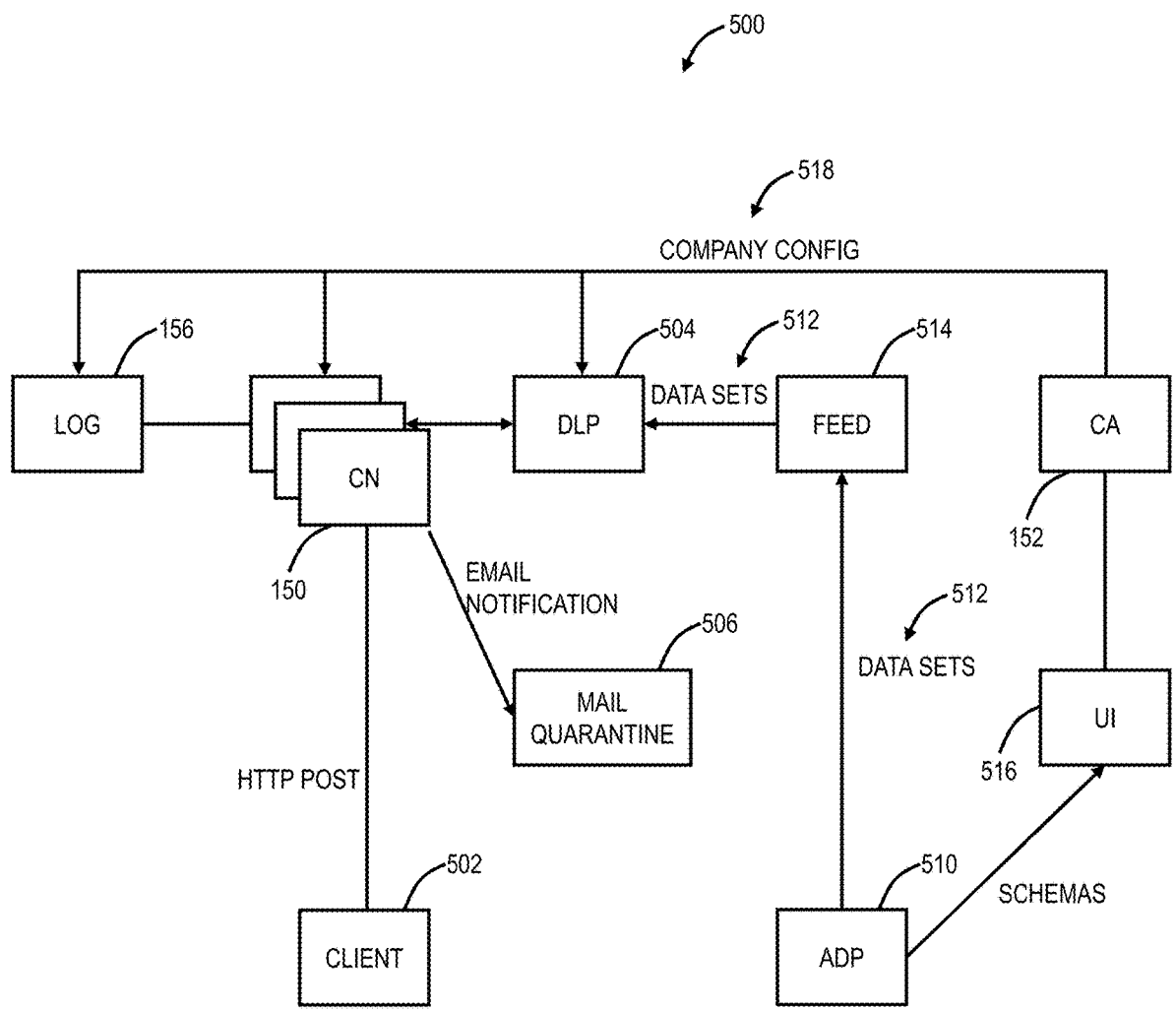
FIG. 5 is a network diagram of an EDM system implemented through the cloud-based system of FIG. 1.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (User Equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes— they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
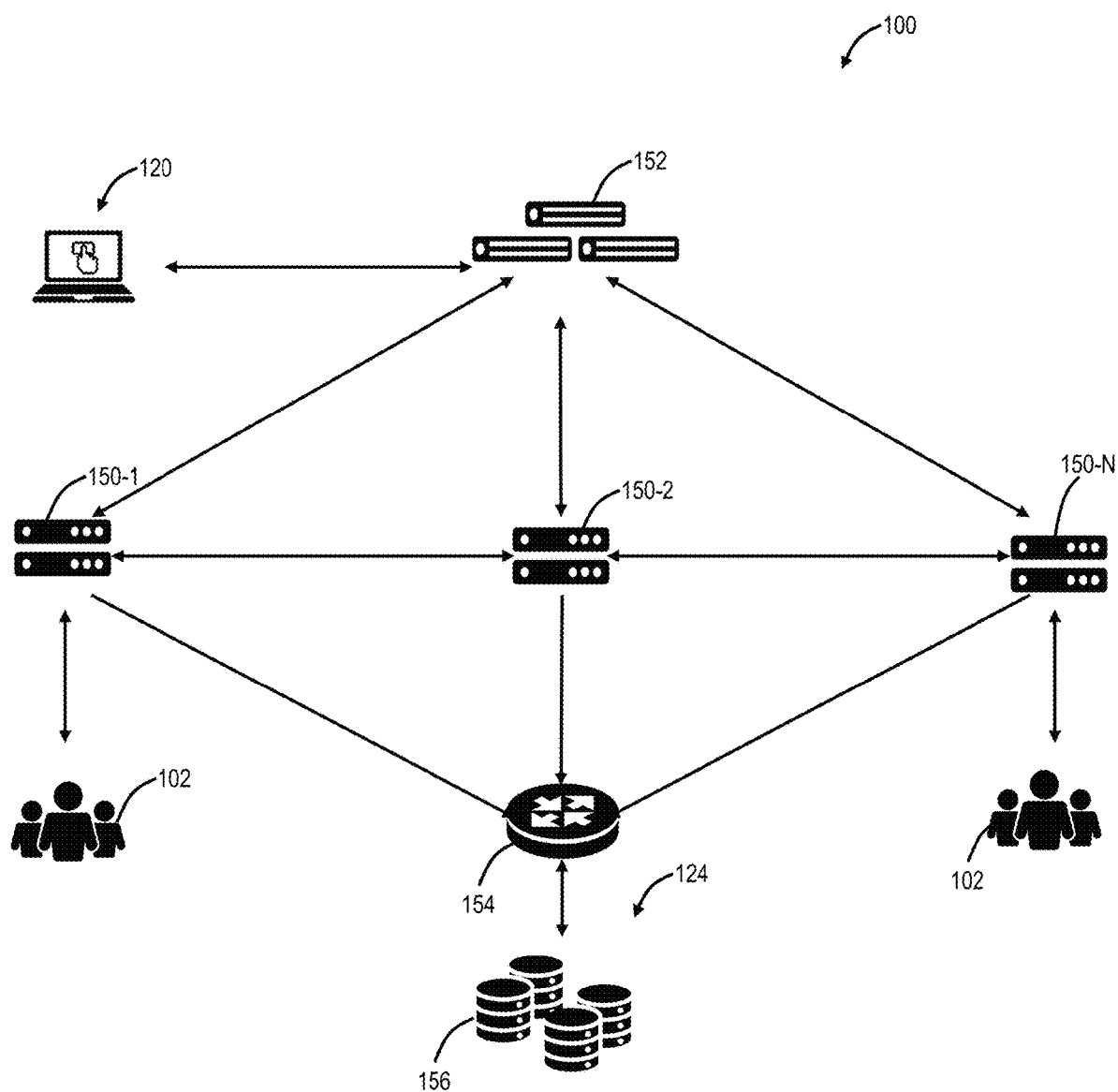
FIG. 1B is a network diagram of an example implementation of the cloud-based system.

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality.

In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

Example Server Architecture

Figure 2:
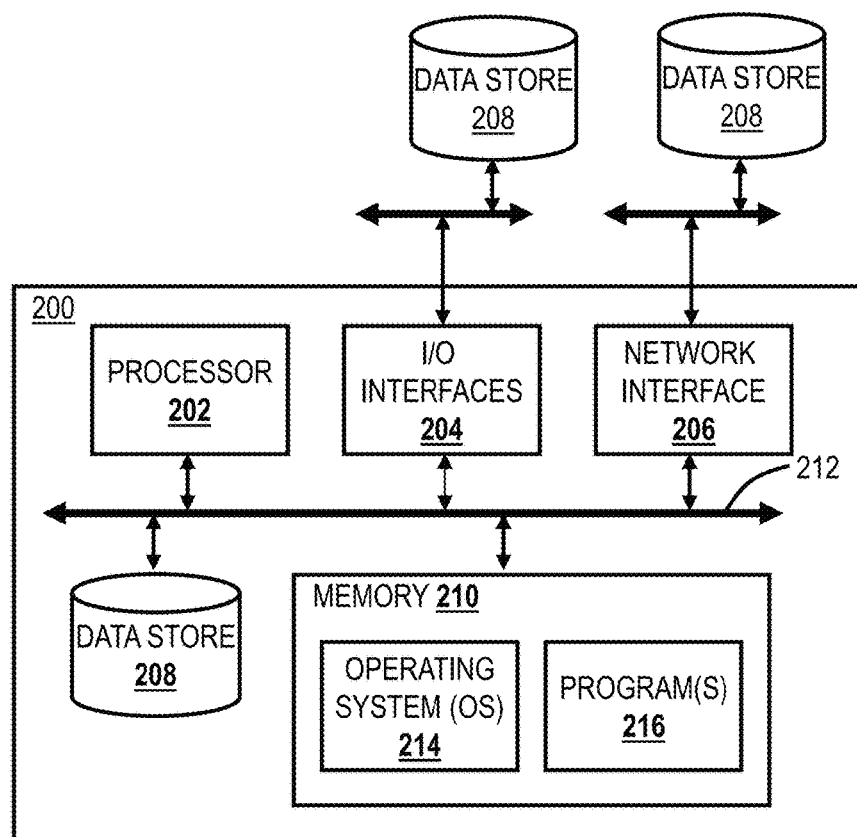
FIG. 2 is a block diagram of a server which may be used in the cloud-based system of FIGS. 1A-1B, in other systems, or stand-alone.

FIG. 2 is a block diagram of a server 200 which may be used in the cloud-based system 100, in other systems, or standalone. For example, the nodes 150, the central authority 152, and/or other nodes may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 3:
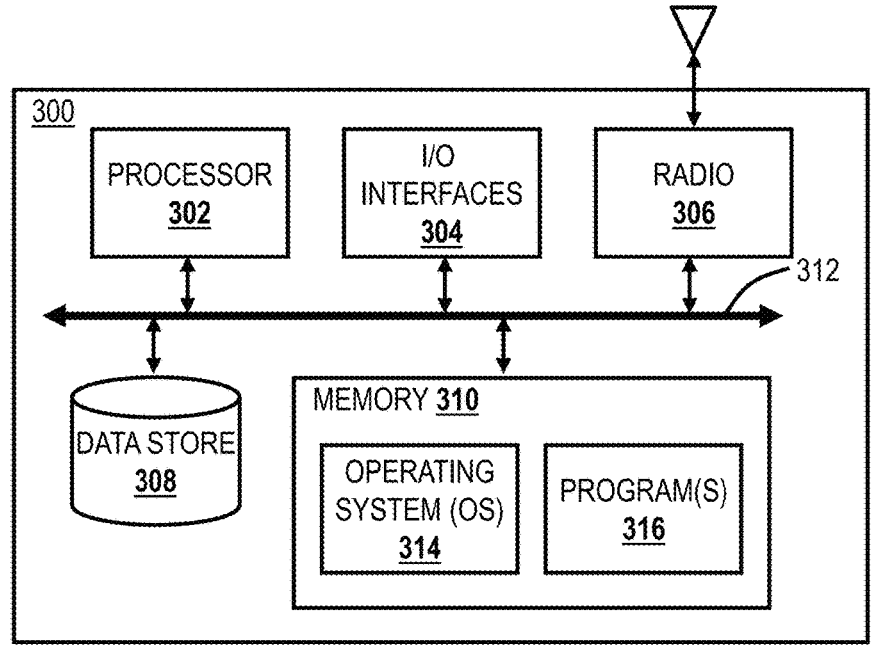

FIG. 3 is a block diagram of a user device 300, which may be used in the cloud-based system 100 or the like. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chip set), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e. camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

Exact Data Matching

FIG. 4 is a diagram of an example of exact data matching with a structured data source 400 and an associated example email message 402. Exact Data Matching (EDM) is the ability to identify a record from the structured data source 400 (or any other structured data source) that matches a predefined criterion. Enterprises (e.g., health care providers, banks, etc.) want to protect PII from being lost (i.e., transmitted outside of the enterprise's network). Thus, an aspect of EDM is the ability to identify and correlate multiple tokens which contribute to a single data record. For example, the email message 402 includes three specific tokens from record number 3 in the structured data source 400. It is an objective of an EDM system, through the cloud system 100, to identify this record in data streams from users.

FIG. 5 is a network diagram of an EDM system 500 implemented through the cloud-based system 100. The EDM system includes one or more clients 502 (e.g., one of the users 102 with a user device 300) connected to the Internet via the cloud nodes 150. The cloud nodes 150 connect to the central authority 152, the log node 156, a DLP processing engine 504, and a mail/quarantine server 506, and these components can be viewed as a data plane which processes EDM for DLP on data to/from the clients 502. A control plane in addition to the data plane can provide data sets and configuration of the DLP processing engine 504. An Advanced Data Protection (ADP) virtual appliance 510 can be accessed by the enterprise IT administrators for defining the EDM. The ADP virtual appliance 510 enables data sets 512 to be provided via a central feed distribution server 514 from the enterprise, and a user interface 516 allows the enterprise IT administrators to define a company configuration 518 which is provided to the DLP processing engine 504 and the cloud nodes 150 via the central authority 152. Also, the log node 156 is connected to the central authority 106 for configuration and log display.

The control plane is used to deliver data sets and configuration to the DLP processing engine 504. Specifically, an administrator provides requirements via the ADP virtual appliance 510, such as via a command line tool, the user interface 516, an EDM client which connects via an Application Programming Interface (API), etc. Once the control plane has the EDM configured, the data plane processes requests to/from the clients 502. The cloud nodes 150 can implement the DLP processing engine 504 or communicate to another server implementing the DLP processing engine 504. After an EDM event is detected by the DLP processing engine 504, the associated data can be quarantined, and administrators can be notified.

EDM Control Plane Configuration—ADP Virtual Appliance

The ADP virtual appliance 510 can include various Virtual Machine (VM) packages for each customer (enterprise, etc.). The ADP virtual appliance 510 can include a browser-based UI, command line tool, etc. The customer, e.g., IT administrator, can be authenticated in the ADP virtual appliance 510 via a client certificate. The purpose of the ADP virtual appliance 510 is to allow the customer to upload, update, etc. a data set for EDM (the data sets 512) and to provide the company configuration 518. The ADP virtual appliance 510 can be implemented within the company's network, and an objective of the data sets 512 is to be obscured, so the associated records are unreadable by the cloud-based system 100 or in transit. Specifically, the structured data sources 400 are hashed using a one-way hash to transform the sensitive data into a digest, and the associated records are provided as the hash table for look up in the EDM system 500. That is, the data sets 512 from the ADP virtual appliance 510 are look up tables. Also, the ADP virtual appliance 510 can be auto-updated with the latest application software distributed from the cloud feed node. Further, all communications can be secure between the various devices, such as via Secure Sockets Layer (SSL) with certificate-based authentication.

To add a new schema, a user can specify a source file for the ADP virtual appliance 510. The source file is a structured data source 400, i.e., contains records which can be kept in columns, rows, etc. For example, the source file can be a CSV file (Comma Separated Values) or the like. From the source file, the ADP virtual appliance 510 will parse the headers (row 1), and the user can select columns for a new schema and select a column key. The ADP virtual appliance 510 can upload the schema information to the central authority 152 via a Representational state transfer (REST) API.

Once the schema is determined, the ADP virtual appliance 510 can include an application to generate the hashes file on the source file based thereon. The application can preprocess the source file to remove extraneous spaces, convert hyphenated numbers to numeric strings, etc. The application can then generate a table of hashes of all objects in the source file (e.g., CSV file), calculate a row hash for each row, and sort the table based on the row hash value. The table can be stored as a file, e.g. "orgid_schema-name.md5" and then uploaded to the central feed distribution server 514. In an embodiment, the hashes can be based on MD5.

Figure 6:
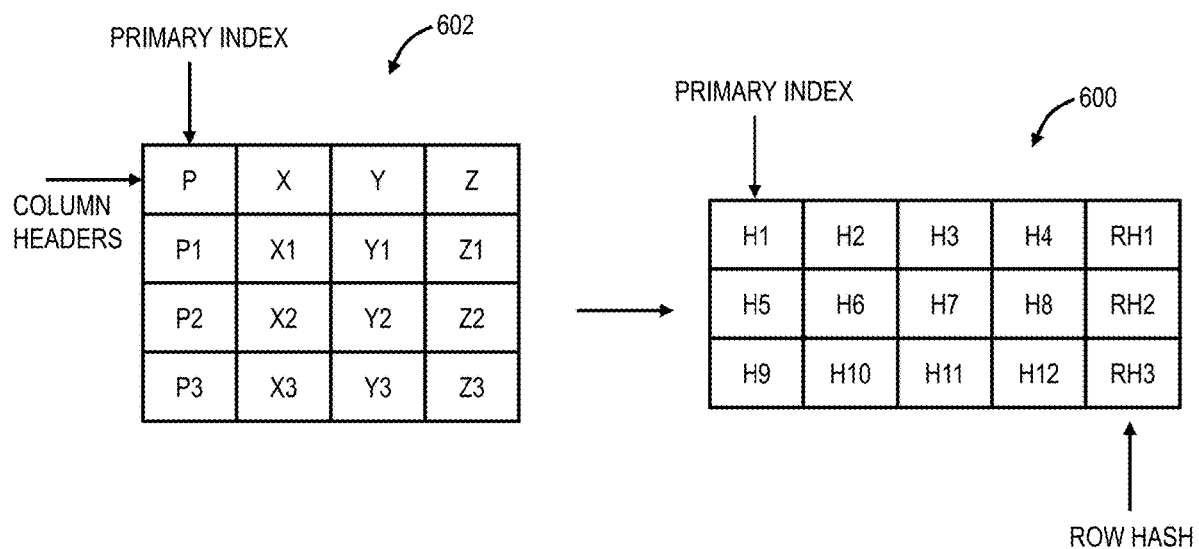
FIG. 6 is a block diagram of an example of creating a hash file from an example source file.

FIG. 6 is a block diagram of an example of creating a hash file 600 from an example source file 602. The source file 602 has a header row of P, X, Y, Z and the first column, P, is the primary index. The source file 602 further contains data records in the rows, e.g., P1, X1, Y1, Z1, etc. The hash file 600 contains a hash of each data record, e.g., H1 for P1, H2 for X1, H3 for Y1, H4 for Z1, and RH1 for a row hash of the row, etc.

When the customer wants to update the source file for a schema, the ADP virtual appliance 510 can invoke its application to generate the new hashes and a delta file. This process includes generating a new hash file per the updated source file. Next, using the row hashes, the application can determine deltas, i.e., rows added "+" and rows deleted "−" as compared to the previous hash file 600. The deltas can be stored in a file, e.g., "orgid_schema_version.delta," and uploaded to the central feed distribution server 514 where the updated hash file 600 replaces the previous version. Specifically, when the customer has updates to the data sets, the system is able to find the delta between the old and new datasets (additions, deletions, updates). Only the tokens (i.e., the delta) are transformed to a hash representation updated to the cloud nodes. The cloud nodes are kept in sync with the latest data set the customer has submitted.

EDM Control Plane Configuration—ADP Virtual Appliance to Cloud Protocol

The ADP virtual appliance 510 can communicate with the central authority 152 via the UI 516 using the REST API. The UI 516 can authenticate the ADP virtual appliance 510 such as using a username/password or the like. The ADP virtual appliance 510 will then use an API_Key in every message to interact with the API, such as for subsequent operations—i) add a new schema, ii) list existing schemas, iii) update the source file for existing schema, and iv) delete existing schemas. To list existing schemas, the API can return JSON (JavaScript Object Notation) data containing information for each schema. To add a new schema, the AP will accept the schema info for a data set 512 from the ADP virtual appliance 510. The schema information can include, for example:

Schema name (must be unique for an organization) (Max length 127)
Number of columns (Max columns 12)
Selected column names (Max length 63)
Key columns selected (Max 4)
Token type information of key columns
Minimum token length of key columns (range 4-24)

Once the schema information is posted to the central authority 152, the hash data set can be uploaded to the central feed distribution server 514.

To update existing schema, the existing schema is selected, and a new source file is provided for this schema. This may be performed as additional information is added to the structured data source. To delete existing schema, the ADP virtual appliance 510 will check via the API if there are any policies bound to this schema. If there are no policies, the schema can be deleted. If there are policies, the ADP virtual appliance 510 can communicate to the central feed distribution server 514 to delete the hash file 600 associated with this schema.

The following tables can be used to handle EDM information in an example embodiment:

| EDM_schema_metadata | | |
| --- | --- | --- |
| Sch_ID | Integer | Not null |
| Org_ID | Integer | Not null |
| EDM_client_ID | Integer | Not null |
| Sch_version | Text | Not null; default "1.0" |
| Tot_columns | Integer | Not null |
| File_name | Text | Not null |
| Flag | Integer | Default 0 |
| Mod_time | Integer | Not null |
| Mod_UID | Integer | Not null |
| Create_time | Integer | Not null |
| Create_UID | Integer | Not null |
| Sch_revision | Integer | Not null; default 1 |
| Sch_upload_status | Integer | Not null; default 0 |
| Sch_orig_filename | Text | Not null |

| EDM_schema_details | | |
| --- | --- | --- |
| Sch_ID | Integer | Not null |
| Org_ID | Integer | Not null |
| Col_name | Text | Not null |
| Col_type | Integer | Not null |
| Is_primary | Boolean | Default F |
| Col_order_cust_upload | Integer | Not null |
| Mod_time | Integer | Not null |

-continued

| EDM_schema_details | | |
|---|---|---|
| Mod_UID | Integer | Not null |
| Col_order_hash_file | Integer | Not null |

| EDM_schema_dictionary_mapping | | |
|---|---|---|
| Sch_ID | Integer | Not null |
| Org_ID | Integer | Not null |
| Mapping_order | Integer | Not null |
| Primary_bitmap | Integer | Not null |
| Primary_coltype_bitmap | BigInt | Not null |
| Sec_bitmap | Integer | Not null |
| Sec_coltype_bitmap | BigInt | Not null |
| Action | Integer | Not null |
| Match_on | Integer | Not null |
| PRIMARY_KEY(sche_id, dict_id, mapping_order, primary_bitmap, sec_bitmap) | | |

```
MODULE_HEADER
   (module_id, module_len)
-------------------------------------------------------------------
struct dlp_company_config    Meta-data about the following dip config.
--------------------Dip dictionary info for EDM----------------------------
  ^
  ^
  |
  |
struct template[struct dlp_company_config.num_edm_schemas]
struct template_dict[struct dlp_company_config.num_edm_schemas_in_dict]
  |
  |
  V
  V
------------------Dlp dictionary info for phrases and patterns---------------
  ^
  ^
  |
  |
struct pp_dict[struct dlp_company_config.num_dicts]
struct dip engine[struct dlp_company_config.num_engines]
  |
  |
  V
  V
-------------------------------------------------------------------
END_OF_DLP_MODULE
-------------------------------------------------------------------
```

EDM Control Plane Configuration—Central Feed Distribution Server

The central feed distribution server 514 stores the hash files 600 for all schemas for all companies in its file system. For example, if the cloud-based system 100 is a multi-tenant security system, this can include the hash files 600 for all customers. The central feed distribution server 514 also generates the initial index lookup for all schemas of a company. The hash files 600 and index lookup files for each Org_ID can be organized in one directory and distributed together as a package to all of the DLP processing engines 504. Again, these hash files 600 do not contain the actual PII data, but hash representations. Thus, there is no security risk.

Figure 7:
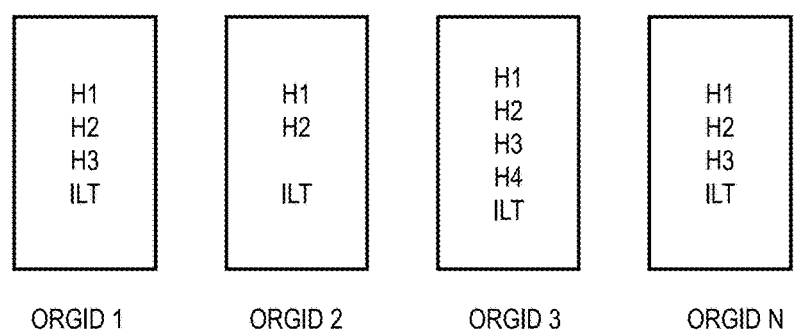
FIG. 7 is a diagram of hash files and index lookup tables (ILT) for different organizations.
Figure 8:
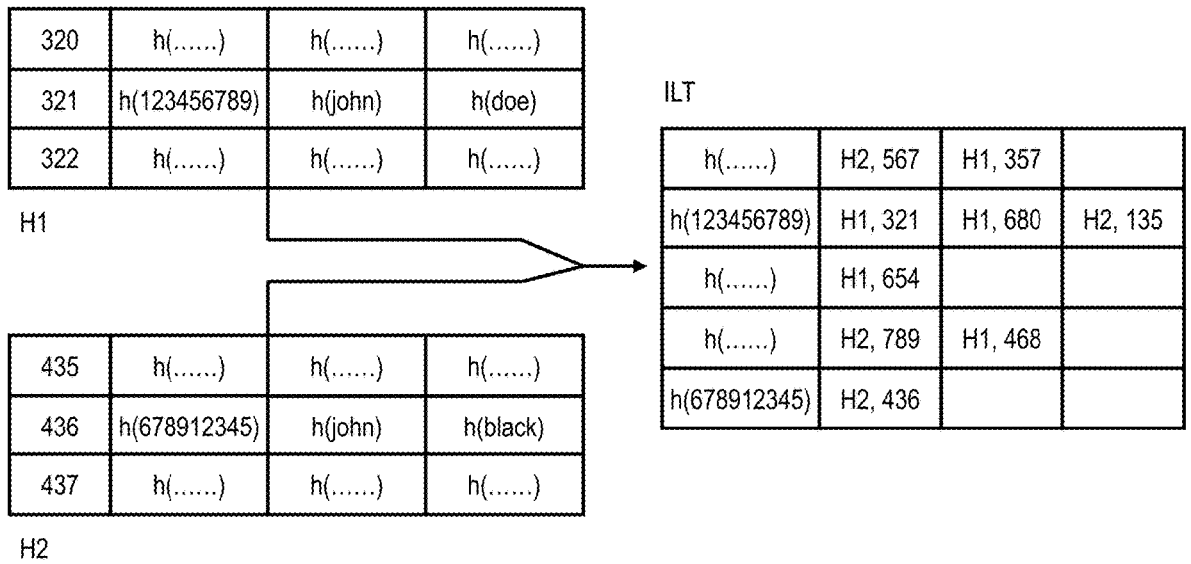
FIG. 8 is a diagram of the memory mapping of the hash files H1, H2 to the ILT.

FIG. 7 is a diagram of hash files and index lookup tables (ILT) for different organizations (Orgid 1, Orgid 2, etc.). The central feed distribution server 514 and the DLP processing engines 504 can use a common library to generate the index lookup table and to do a key MD5 lookup. To do an MD5 lookup, the full index lookup file and the hash files 600 will be memory mapped. The index lookup file contains a hash map for the primary keys from all schemas as an index, and the value is the hashes file ID and the row index for that key. FIG. 8 is a diagram illustrating the memory mapping of the hash files H1, H2 to the ILT.

Data Plane—Cloud Node and DLP Processing Engine

Figure 9:
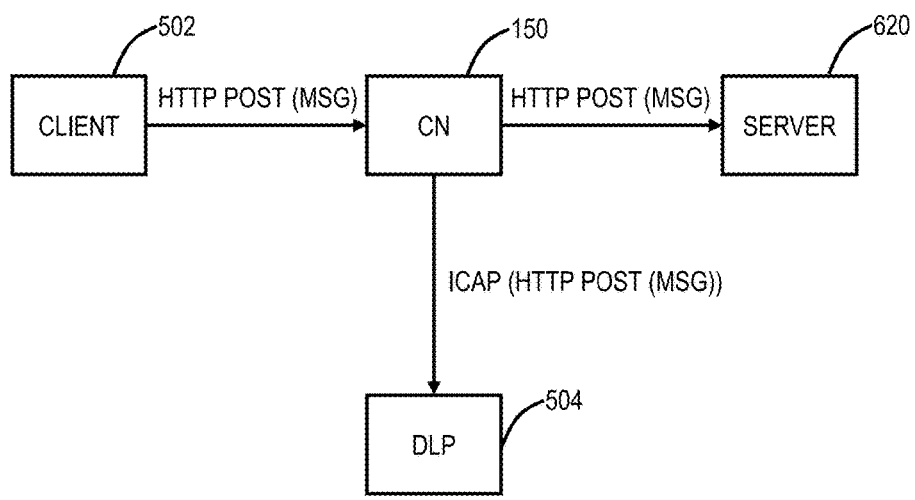
FIG. 9 is a network diagram of a portion of the EDM system of FIG. 5 for interaction between the various nodes in the data plane.

FIG. 9 is a network diagram of a portion of the EDM system 500 for interaction between the various nodes in the data plane. The cloud node 150 is configured to perform inline monitoring of the client 502. For example, this can include Zscaler Internet Access (ZIA) available from Zscaler, Inc. Through the inline monitoring, the cloud node 150 receives a POST/PUT request. The cloud node 150 checks if the company configuration 518 for the client 502 has a DLP EDM policy and the DLP processing engine 504 is configured. If so, the cloud node 150 provides the request to the DLP processing engine 504. For delivery from the cloud node 102 to the DLP processing engine 504, the cloud node 102 can wrap the client POST message in an Internet Content Adaptation Protocol (ICAP) message with added header fields for the user, the Org ID, the location ID, and a transaction ID.

The DLP processing engine 504 can treat the POST requests from the cloud node 150 as tunnel requests and the DLP processing engine 504 will fetch the company configuration 518 using the headers in the POST header. The following data structures can be used:

Proposed Structure for EDM Dictionaries.

```
typedef struct edm_schema{
    u16bits id;
    u08bits name[MAX_NAME_LEN+1];
   }edm_schema_t;
typedef struct edm_template_dict{
    u08bits dict_id;
    u16bits schema_id;
    u08bits mapping_number;
    u16bits primary_colnum_bitmap;
```

```
       u128bits primary_coltype_bitmap;
       u16bits sec_colnum_bitmap;
       u128bits secondary_coltype_bitmap;
       u08bits sec_matchon;
       u08bits action;
          }edm_template_dict_t;
```

Data Plane—EDM Processing

For inline tokenization, tokenization is breaking up data into words or tokens. The type of token can be determined by the first character of the word and the previous character. Prior to the EDM described herein, DLP tokenization was done roughly with one-way traffic, i.e., it does not look back during the scanning. For data types mixed with letters and digits, the tokenizer scans the phrase part and the number part separately and stitch them together by tracking the matching state. Also, when the DLP engine loads customer configured dictionaries that contain alphanumeric phrases, it breaks them up into word phrase and numeric phrase separately.

However, with the EDM described herein, the DLP processing engine 504 can examine traffic that may contain arbitrary alphanumeric inline data, so the tokenizer must handle more complicated scenarios. For example, when reading a digit followed by a letter, the letter could either denote the end of a number token or the continuation of an alphanumeric token. As a result, the DLP tokenizer needs to be enhanced to look back and find the beginning of an alphanumeric token whenever it reads a letter and a digit adjacent to each other. To achieve this, a set of delimiters and token types are defined as follows. The EDM system can include delimiters for words, numbers, numeric phrases, alphanumeric, and email addresses. Each delimiter provides a boundary for a token of that type.

| | |
|---|---|
| Word delimiters | everything except (A-Z, a-z, underscore, hyphen) |
| Number delimiters | everything except (0-9, space, hyphen) |
| Numeric phrase delimiters | everything except (0-9, hyphen) |
| Alphanumeric delimiters | everything except (A-Z, a-z, 0-9, underscore, hyphen) |
| Email address delimiters | everything except (A-Z, a-z, 0-9, and special characters as defined in RFC822 and enforced by EDM client as well, i.e.: !#$%&'*+-./=?^_'{\|}~) |

Token Types

Similar to the delimiter types, the token types can be words, numbers, numeric phrases, alphanumeric, and email addresses. For a word token, the first character is an alphabet, and the previous character is a word delimiter. To perform tokenization of a word token, the DLP processing engine 504 collects all characters into a token buffer until a word delimiter is read. For normalization, the DLP processing engine 504 can remove any characters other than letters and convert all letters to lowercase. Note, the hash files 600 can also be created based on the normalization, i.e., the normalization is performed in a similar manner on the source files prior to creating the hashes.

For a number token, the first character is a digit, and the previous character is a number delimiter. To perform tokenization of a number token, the DLP processing engine 504 collects the digits into a token buffer until a number delimiter is read. For normalization, the DLP processing engine 504 can remove any characters other than the digits (e.g., hyphens, etc.).

Alphanumeric tokens can fall into two cases. First, if the token starts with a digit and the previous character is a letter. The DLP processing engine 504 looks back until a word delimiter is found, then collects from this character forward until an alphanumeric delimiter is read. Second, if the token starts with a letter and previous character is a digit. The DLP processing engine 504 looks back until a numeric phrase delimiter is found, then collects from this character forward until an alphanumeric delimiter is read. For normalization of the alphanumeric tokens, the DLP processing engine 504 removes any characters other than letter and digit and converts to lowercase.

For an email address token, the first letter is the at sign "@". For tokenization, the DLP processing engine 504 looks back until an email address delimiter is found, then collects from this character forward until an email address delimiter is read.

For example, for the following inline data:
  ab-cd4929 3813-3266 4295xyz foo.bar@gmail.com
The EDM tokens are:
  abcd, abcd4929, 4929381332664295, 4295xyz, xyz, foo, bar, foo.bar@gmail.com, grail, corn
On the contrary, the DLP tokens are:
  ab, cd, 4929 3813-3266 4295, xyz, foo, bar, gmail, com
An EDM token could be any of those types listed above, whereas a DLP token could only be word or number tokens.

Exact Match Lookup

Figure 10:
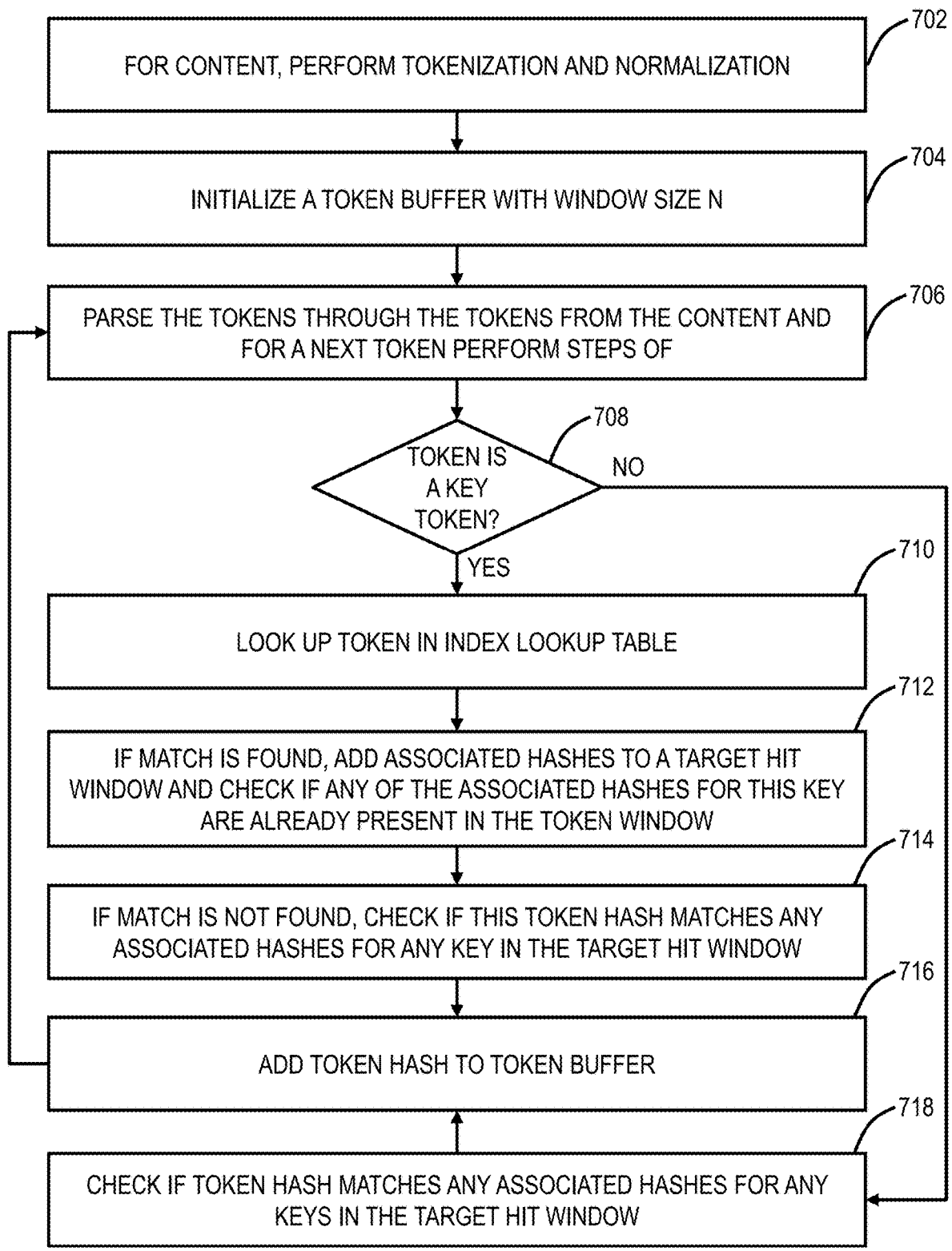
FIG. 10 is a flowchart of a method for exact match lookup.

FIG. 10 is a flowchart of a method 700 for exact match lookup. The method 700 can be implemented through the EDM system 500 and is implemented upon receipt of content. For example, the content can be a data stream, email message, file document (e.g., Word, Excel, etc.), text message, or any other type of content. Again, the content is obtained based on inline monitoring in the cloud-based system 100 by the cloud node 150. Once the content is obtained, tokenization and normalization are performed on the content (step 702). The process of tokenization and normalization is as described herein.

The method 700 includes identifying the company configuration 518, and the data sets 512. This provides the specific EDM data that is searched for in the content. The method 700 includes initializing a token buffer (or token window) with a window size N (e.g., N may be 32 or the like) (step 704). The token buffer can be a circular buffer with a size of N. At this point, the method 700 includes parsing through the tokens from the content and performs the following steps for each token (step 706).

First, the method 700 includes checking if the token is a key token (step 708). The key token is one in the schema that is used for the primary index (e.g., column P in the source file 602). Note, there can be more than one primary index, with the method 700 concurrently looking for the multiple primary indexes and with multiple token windows. This checking can include determining if the token is the same type (word, number, alphanumeric, email address token) as the primary index as defined in the schema. For example, if the primary index is a word token, and the current token being evaluated is a number, etc., then this current token is not a key token.

If the token type is a key token (step 708), the method 700 includes looking up the token hash in the Index Lookup Table (ILT) (FIG. 8). If a match is found, i.e., the current token's hash is in the ILT, then the method 700 includes adding the associated hashes to a target hit window (MT) and checking the rest of the token buffer to see if any associated hashes for this key are already present in the token window (step 712). For example, if the current token is found, e.g., the token is H1 (from FIG. 6), the token window is checked to see if H2, H3, or H4 are also present.

If a match is not found, the method 700 includes checking if this token hash matches any associated hashes for any key in the target hit window (step 714). The method 700 then includes adding the token hash for the current token to the token buffer (step 716).

If the token is not a key token type (step 708), the method 700 includes checking if the token hash matches any associated hashes for any keys in the target hit window (step 718). If the token is a number token and the key token type is a word token, this step includes checking if the number token is associated with any record for any of the key tokens in the target hit window. For example, assume the token is H2 (from FIG. 6), this step includes checking the target hit window for H1 (from FIG. 6). The method 700 then includes adding the token hash for the current token to the token buffer (step 716).

After step 716, the method 700 returns to the next token (step 706). Once all tokens are evaluated, the method 700 includes a number of tokens that match a specific record associated with a primary key. Based on the number of matching tokens for a specific record, the EDM system 500 can take action, such as block, notify, and/or quarantine. In some embodiments, the number of matching tokens is all of the tokens in a specific record. In other embodiments, the number may be less than all of the tokens, such as user configurable.

Figure 11:
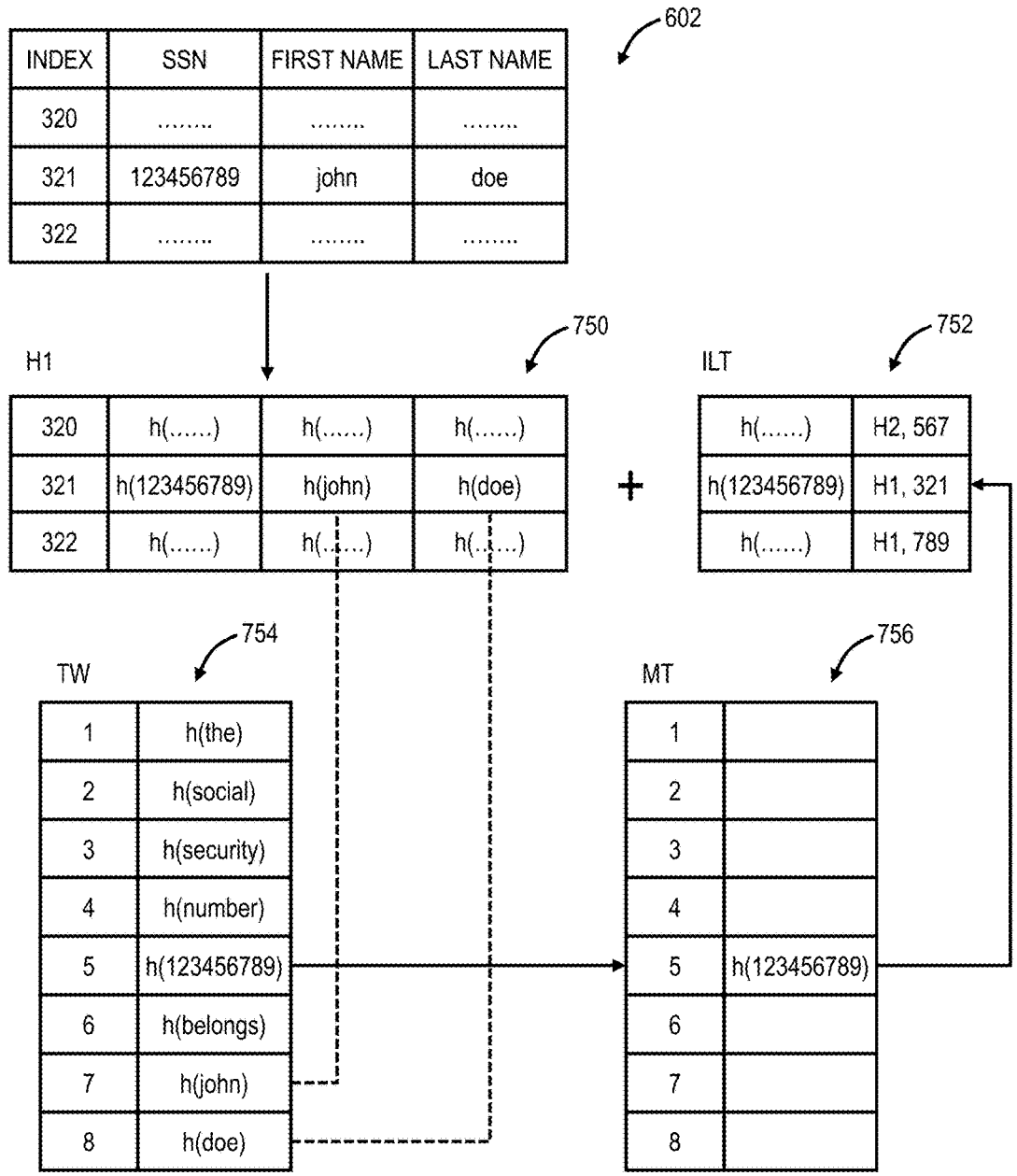
FIG. 11 is a diagram of an example of the method of FIG. 10.

FIG. 11 is a diagram of an example of the method 700. Assume for this example the window size N=8 and the example content is "The social security number 123456789 belongs to John Doe." The source file 602 is shown which is hashed to a table 750 which an ILT 752 with the primary key based on Social Security Number (SSN). A token window 754 is filled with the tokens—the, social, security, number, 123456789, belongs, john, doe. Note, all of the tokens are word tokens except 123456789 which is a number token and the primary key token. The token window 754 is filled with the tokens until the primary key token 123456789 is seen and this is added to a target hit window 756. Once the final tokens of john and doe are parsed, it is determined they belong to the record associated with the primary key token 123456789. Thus, there are 3 token matches in this example.

Example PII

The following table includes examples of PII data used in the EDM.

| # | Data Type | Data Validation Details |
|---|---|---|
| 1 | Social Security Numbers | Numeric string |
| 2 | Payment Card Numbers | Numeric string |
| 3 | Medical Record Number | These can be organization specific. |
| 4 | Tax ID | It can be further divided into country specific Tax ID |
| 5 | Bank account number | These can be organization specific. |
| 6 | ABA Routing number | Numeric string |
| 7 | First Name | Alpha string |
| 8 | Last Name | Alpha string |
| 9 | Phone number | Valid phone number |
| 10 | Email Address | Valid email address |
| 11 | DMV license numbers | It can be further divided into state specific numbers |
| 12 | Date | Birthdate |

EDM Process

Figure 12:
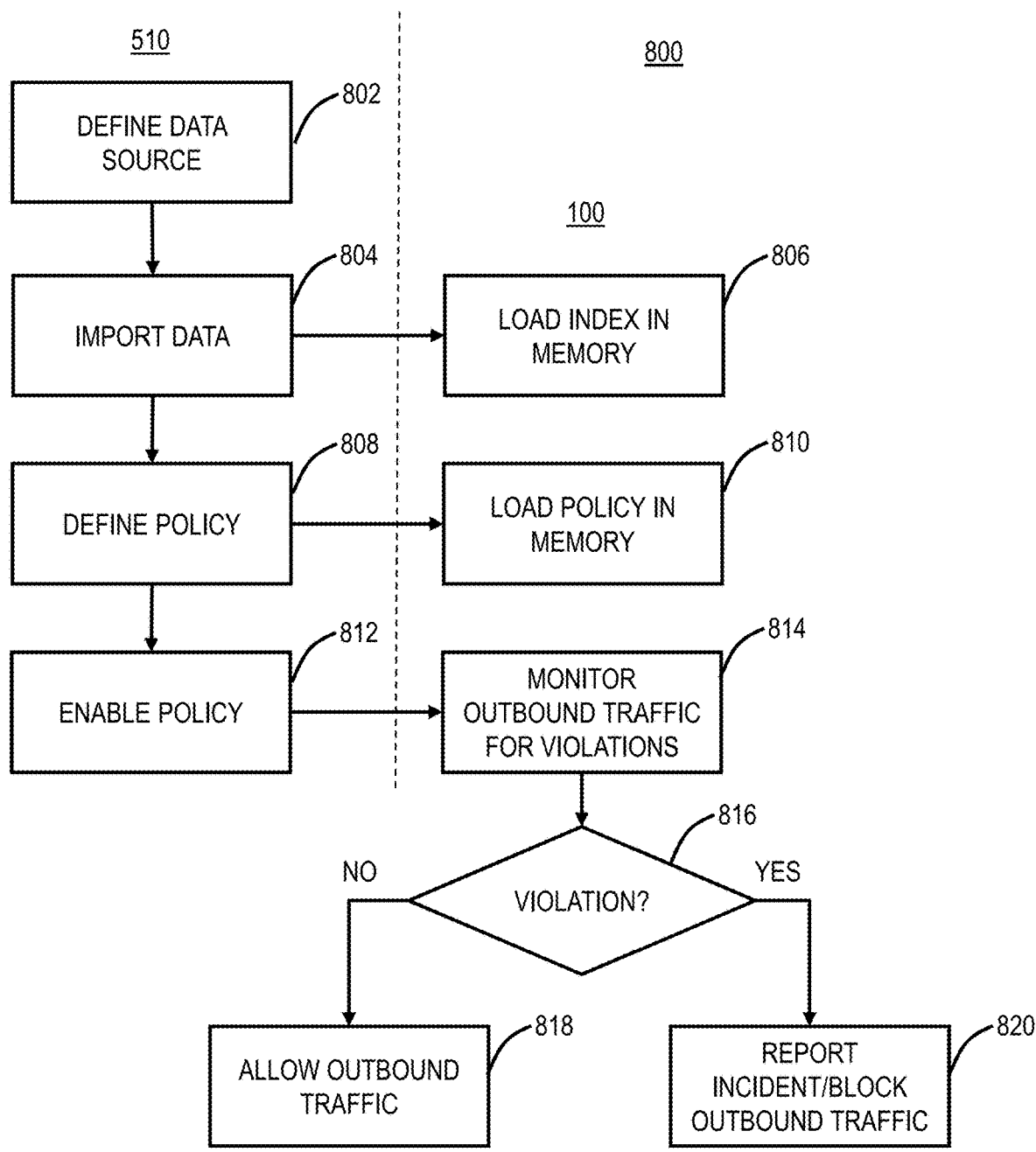
FIG. 12 is a flowchart of an EDM process implemented between the cloud-based system and the appliance.

FIG. 12 is a flowchart of an EDM process 800 implemented between the cloud-based system 100 and the appliance 510. The process 800 proceeds from two components, namely the appliance 510 where IT configures EDM and the cloud-based system 100 where the EDM is enforced on the users 102. A data source is defined as described herein (step 802) and the data is imported via the appliance 510 (step 804), and the corresponding index is loaded into memory in the cloud-based system 100 (step 806), e.g., into one of the nodes 150.

An admin can also define policy (step 808) via the appliance 510, and the policy is also loaded into memory in the cloud-based system (step 810). As described herein, policy defines an action to take when there is a hit in the index, e.g., allow, block, report, etc. Finally, IT can enable policy (step 812), e.g., turn on EDM for all values in the index, for select values, etc.

Once enabled, the cloud-based system 100 is configured to monitor outbound traffic for EDM violates (step 814), i.e., hits on the index. That is, a violation includes a hit in the outbound traffic for some value in the index. If there is no violation (step 816), the cloud-based system 100 allows the outbound traffic (step 818). If there is a violation (step 816), the cloud-based system 100 can report the incident, block the outbound traffic, or a combination thereof (step 820).

EDM Process with Data Owner Control

Figure 13:
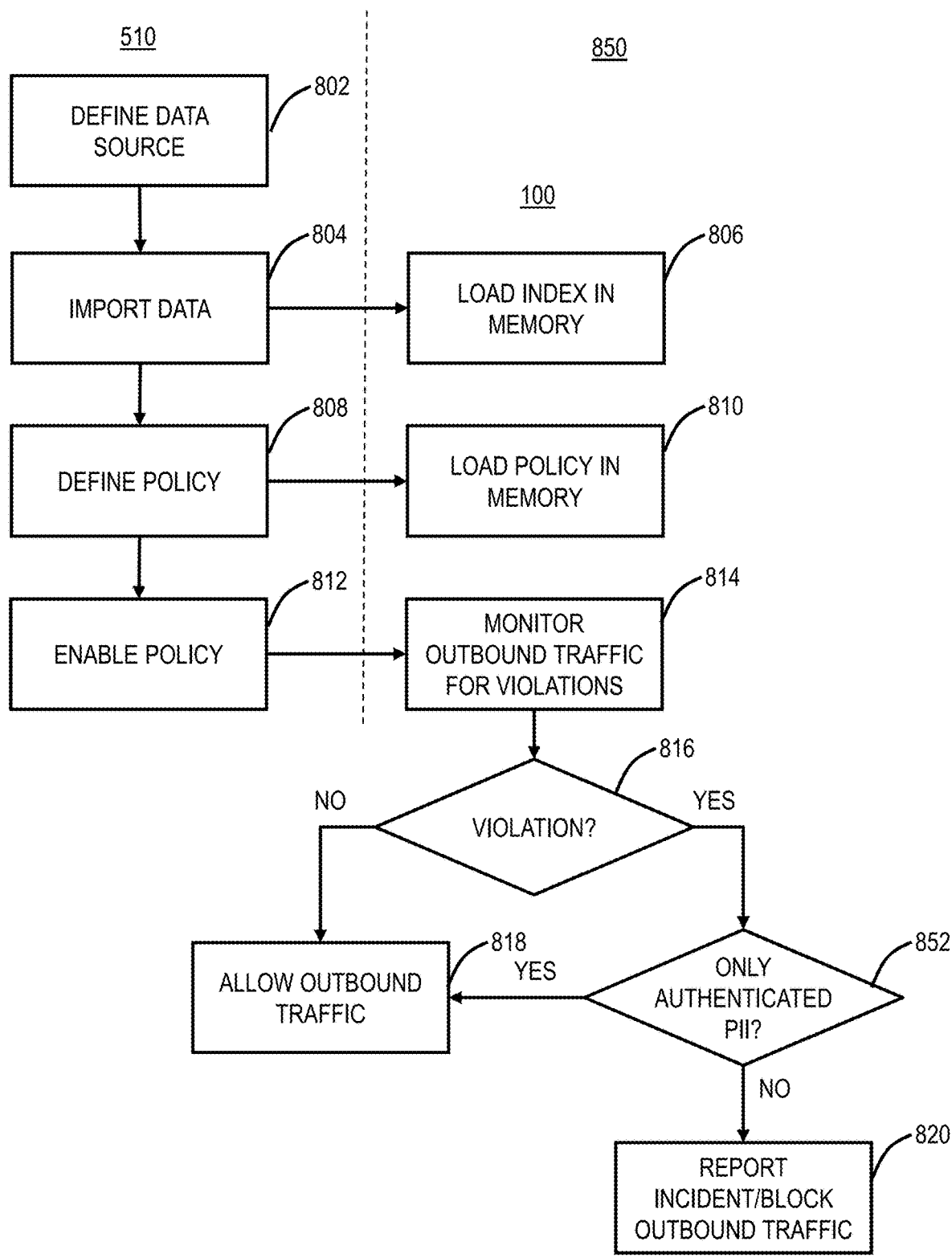
FIG. 13 is a flowchart of an EDM process with data owner control implemented between the cloud-based system and the appliance.

FIG. 13 is a flowchart of an EDM process 850 with data owner control implemented between the cloud-based system 100 and the appliance 510. The EDM process 850 includes similar steps as the EDM process 800 with an extra step of, after a violation (step 816), checking if the violation is for authenticated PII (step 852), and if so, allowing the outbound policy (step 818), assuming policy is configured to allow authenticated PII.

To achieve this feature, during an Exact Data Match indexing process, a user ID that identifies the user 102 of a customer organization is also indexed to identify their users. In most of the cases, e.g., it is the email address of the user 102. Other fields as well as a combination of fields can be used to uniquely identify the user 102, such as email address, user ID, employee number or a combination of such fields by proxy, email or SAAS services, etc.

Figure 14:
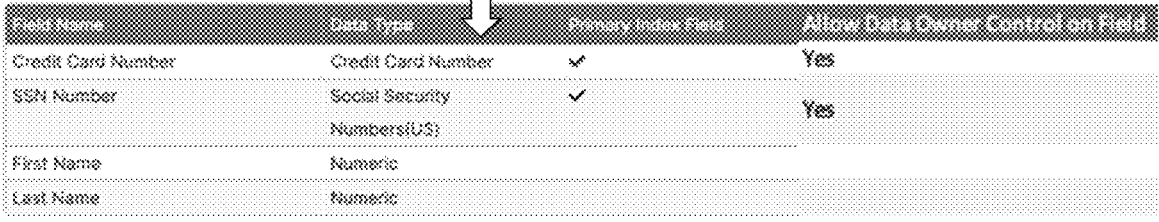
FIG. 14 is a screenshot of a configuration checkbox for the EDM process with data owner control.

Within DLP and CASB policies using Exact Data Match templates, the policy can include a configuration checkbox (FIG. 14) to allow a data owner to use only their own PII in outbound communication without raising incidents using Exact Data Match. This can be configured at an individual field level to make sure data values only from specified list of field are allowed to be communicated outside.

As described herein, a data owner is a user 102 where a particular value of PII belongs to the user 102. For example, allow me to email my SSN, but block me from email other people's SSNs.

Data Owner Control Use Cases

A first use case can include an organization want to protect data from human resources systems that can be exported. Here, the organization can have control over which columns represent data loss in a policy, while allowing a data owner to control their own data.

A second use case can be the same as the first use case, except while allowing a data owner to transmit their PII, the process 850 can include a notification to let IT know if any of the PII data ever leaves company premises.

Those skilled in the art will recognize there can be various other use case. The allowability of PII or any other sensitive data items can include credit card numbers associated with the same record. Example any cell entry on that line of record once we establish that this person is authenticated user1 and they are given this company credit card or they are using their own SSN.

Incident Reporting

Incident reporting workflow is critical since DLP incidents are followed by remediation and tracking processes, incident data must be reported to customers for further processing. Following information must be reported back to customer as a part of incident details—

General—
  Unique incident tracking ID
  Timestamp
  Policy Action
Violator Details—
  User ID
  Group
  Department
  Location ID
  Source IP
  Destination (URL)
  Device ID
Violation Details—
  Policy Name/Rule ID
  Engine Name
  Dictionary
  Name
  Index version
  Count
  Severity
Message Details—
  File type
  Violating content markers
  Original content It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method comprising:
  receiving an index of data for exact data matching, wherein the index includes Personally Identifiable Information (PII);
  receiving policy related to actions to perform for any violations associated with the exact data matching;
  loading the index and the policy into memory;
  monitoring traffic for violations, wherein the violations include detection of any values in the index in the traffic, wherein the monitoring is continuous inline monitoring of the index in real-time; and
  performing an action responsive to any violations and associated policy,
  wherein the index is based on a one-way hash to transform the data into a digest, such that the data is unreadable by a cloud-based system, wherein the data is one or more look up tables is provided by a virtual appliance, and wherein the virtual appliance is auto-updated via a cloud feed node.

2. The method of claim 1, wherein the action is one of reporting the violation, blocking the traffic associated with the violation, and a combination thereof.

3. The method of claim 1, wherein the action is a combination of two or more of:
reporting the violation,
blocking the traffic associated with the violation,
reporting the violation and allowing the traffic associated with the violation when the violation is based on authenticated PII, and
allowing the traffic associated with the violation when the violation is based on authenticated PII.

4. The method of claim 1, further comprising
detecting a violation is authenticated PII of a user performing transmission of the traffic, and allowing the authenticated PII.

5. The method of claim 1, further comprising
detecting a violation is authenticated PII where the traffic is associated with a data owner of the authenticated PII, and allowing the authenticated PII; and
detecting a second violation is unauthenticated PII, and blocking the second violation.

6. The method of claim 1, wherein the index further includes a user identifier, and the policy is tenant-specific and defines access privileges for users, and further includes allowability of some or all of the PII that is authenticated PII, wherein the authenticated PII includes PII for a given user based on the user identifier.

7. A non-transitory computer-readable medium comprising instructions that, when executed, cause one or more processors to perform steps of:
receiving an index of data for exact data matching, wherein the index includes Personally Identifiable Information (PII);
receiving policy related to actions to perform for any violations associated with the exact data matching;
loading the index and the policy into memory;
monitoring traffic for violations, wherein the violations include detection of any values in the index in the traffic, wherein the monitoring is continuous inline monitoring of the index in real-time; and
performing an action responsive to any violations and associated policy,
wherein the index is based on a one-way hash to transform the data into a digest, such that the data is unreadable by a cloud-based system, wherein the data is one or more look up tables is provided by a virtual appliance, and wherein the virtual appliance is auto-updated via a cloud feed node.

8. The non-transitory computer-readable medium of claim 7, wherein the action is one of reporting the violation, blocking the traffic associated with the violation, and a combination thereof.

9. The non-transitory computer-readable medium of claim 7, wherein the action is one of
reporting the violation,
blocking the traffic associated with the violation,
reporting the violation and allowing the traffic associated with the violation when the violation is based on authenticated PII,
allowing the traffic associated with the violation when the violation is based on authenticated PII, and
a combination thereof.

10. The non-transitory computer-readable medium of claim 7, wherein the steps further include
detecting a violation is authenticated PII of a user performing transmission of the traffic, and allowing the authenticated PII.

11. The non-transitory computer-readable medium of claim 7, wherein the steps further include
detecting a violation is authenticated PII where the traffic is associated with a data owner of the authenticated PII, and allowing the authenticated PII; and
detecting a second violation is unauthenticated PII, and blocking the second violation.

12. The non-transitory computer-readable medium of claim 7, wherein the index further includes a user identifier, and the policy further includes allowability of some or all of the PII that is authenticated PII, wherein the authenticated PII includes PII for a given user based on the user identifier.

13. A node in a cloud-based system comprising
a network interface;
a processor communicatively coupled to the network interface; and
memory storing instructions that, when executed, cause the processor to:
receive an index of data for exact data matching, wherein the index includes Personally Identifiable Information (PII),
receive policy related to actions to perform for any violations associated with the exact data matching,
load the index and the policy into memory,
monitor traffic for violations, wherein the violations include detection of any values in the index in the traffic, wherein the monitoring is continuous inline monitoring of the index in real-time; and
perform an action responsive to any violations and associated policy,
wherein the index is based on a one-way hash to transform the data into a digest, such that the data is unreadable by the cloud-based system, wherein the data is one or more look up tables is provided by a virtual appliance, and wherein the virtual appliance is auto-updated via a cloud feed node.

14. The node of claim 13, wherein the action is one of reporting the violation, blocking the traffic associated with the violation, and a combination thereof.

15. The node of claim 13, wherein the action is one of
reporting the violation,
blocking the traffic associated with the violation,
reporting the violation and allowing the traffic associated with the violation when the violation is based on authenticated PII,
allowing the traffic associated with the violation when the violation is based on authenticated PII, and
a combination thereof.

16. The node of claim 13, wherein the instructions that, when executed, further cause the processor to
detect a violation is authenticated PII where the traffic is associated with a data owner of the authenticated PII, and allowing the authenticated PII.

17. The node of claim 13, wherein the instructions that, when executed, further cause the processor to
detect a violation is authenticated PII where the traffic is associated with a data owner of the authenticated PII, and allowing the authenticated PII, and
detect a second violation is unauthenticated PII, and blocking the second violation.

18. The node of claim 13, wherein the index further includes a user identifier, and the policy further includes allowability of some or all of the PII that is authenticated PII, wherein the authenticated PII includes PII for a given user based on the user identifier.

* * * * *